FLUID LOGIC STRUCTURES

Original Filed May 31, 1963 2 Sheets-Sheet 1

INVENTOR
JOHN J. EIGE
BY Samuel Lindenberg
ATTORNEY

May 16, 1967 J. J. EIGE 3,319,885
FLUID LOGIC STRUCTURES
Original Filed May 31, 1963 2 Sheets-Sheet 2
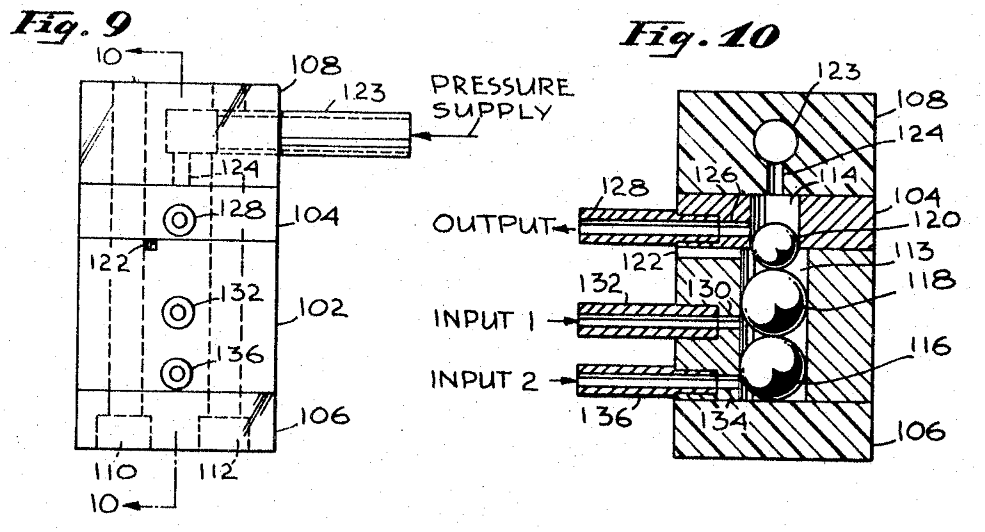
Fig. 9, Fig. 10
Fig. 11
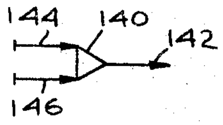
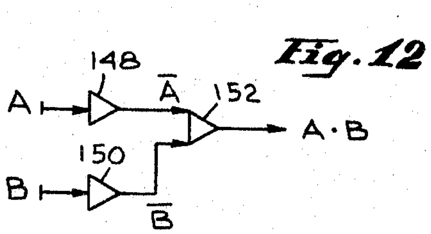
Fig. 13
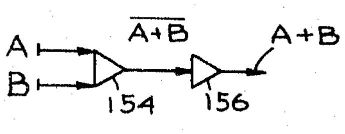
Fig. 14
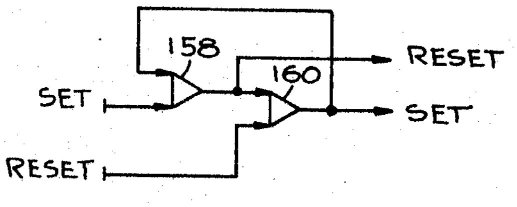
Fig. 15
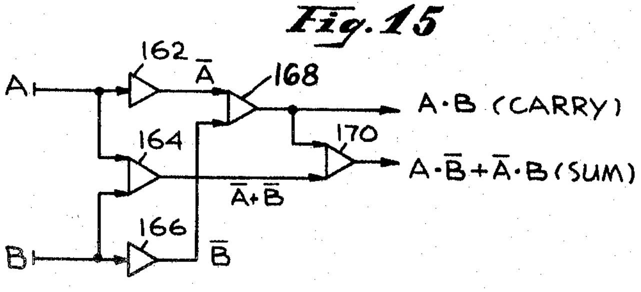
JOHN J. EIGE
INVENTOR.
BY Samuel Lindenberg
ATTORNEY United States Patent Office 3,319,885

Patented May 16, 1967

3,319,885
FLUID LOGIC STRUCTURES

John J. Eige, Redwood City, Calif., assignor to Stanford Research Institute, Menlo Park, Calif., a corporation of California Original application May 31, 1963, Ser. No. 284,725. Divided and this application Apr. 26, 1965, Ser. No. 450,679
5 Claims. (Cl. 235—201)

This invention relates to fluid actuated structures for performing logical operations and more particularly to improvements therein.

This application is a division of application Ser. No. 284,725, filed May 31, 1963, now abandoned by this inventor.

Circuit arrangements for performing logical operations are well known and are employed in data processing machines. However, there are environments in which the electronic components of the electrical logical elements are not fitted for operation. In these environments, provided that results are not required at the speeds of electronic components, mechanical or more specifically, fluid-actuated logical elements can be made to function.

Accordingly, an object of this invention is the provision of a fluid-actuated logical element which may be employed for processing data.

Another object of this invention is the provision of a unique fluid-actuated logical element.

Still another object of the present invention is the provision of a simple and reliable fluid-actuated logical element.

These and other objects of the present invention are achieved by the provision of structure in which there are provided two different size concentric passages in which two different size balls may move or slide. Very little clearance is provided for the balls in these passages. These passages are provided with openings through the walls therethrough so that when air is applied to the smaller passage at one opening it will be emitted from an output opening, in the absence of the application of air to a third opening which communicates with the larger passage. Upon the application of air into the opening into the larger passage, a ball which substantially fills that passage is moved and, in so doing, causes the smaller ball to move in its passage to close off the air emitted from the output opening. By using combinations of this basic structural element many different, useful, logical structures can be produced.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 9 is a top view of another embodiment of the invention;

FIGURE 10 is a cross-sectional view along the lines 10—10 of FIGURE 9;

FIGURE 11 is a schematic representation of the logical structures shown in FIGURES 9 and 10;

FIGURE 12 shows an arrangement of the basic structures to form an And gate;

FIGURE 13 shows an arrangement of the basic structures to form an Or gate;

FIGURE 14 shows an arrangement of the basic structures to form a flip-flop circuit; and FIGURE 15 shows an arrangement of the basic structures to show a half-adder circuit.

Figure 1:
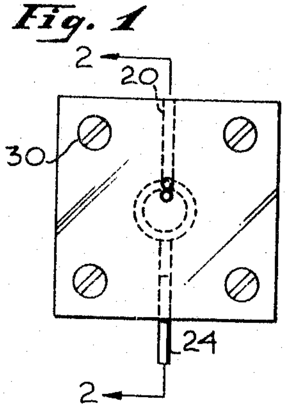
FIGURE 1 shows the appearance of one end of a basic logical element in accordance with this invention.
Figure 2:
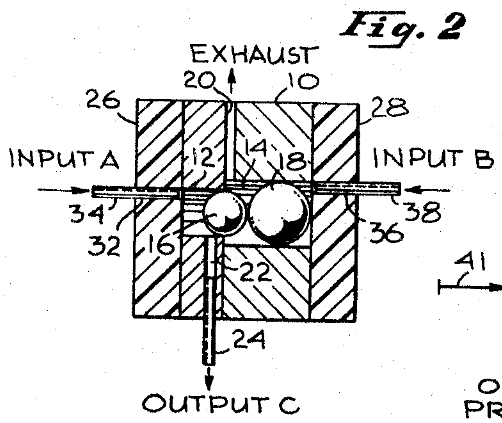
FIGURE 2 is a cross-section therethrough along the lines 2—2.

Referring now to FIGURES 1 and 2 there may be seen an end and cross-sectional view of what may be termed a two-ball arrangement of a fluid-actuated logic structure. This has a basic block of material 10 having concentrically drilled therethrough a smaller passageway 12 and a larger passageway 14. A smaller ball 16 and a larger ball 18 sized to provide a running fit in these passageways are inserted therein.

A hole 20 is milled in the block 10 extending from the larger passageway at its junction with the smaller passageway. This opening is known as the exhaust opening. Another hole 22 is drilled through the block 10 on the opposite side thereof from the exhaust opening 20 and opening into the smaller passageway 12, displaced from the junction therewith with the larger passageway. This is the output opening 22. A tube 24 may be inserted into the output opening 22. End pieces, respectively 26, 28 are attached to the central block 10 by any suitable means such as screws 30. The end pieces 26, 28 serve to close off the smaller and larger passageways respectively 12, 14, except that an input aperture 32 is drilled through the end piece 26 and a tube 34 is inserted therein. This input aperture enables air to be directed against the smaller ball 16. An input aperture 36 in which a tube 38 is inserted, is drilled through the end piece 28 and enables air to be directed against the larger ball 18.

Input to the tube 34 will be designated hereafter as input A. Input to the tube 38 will be designated hereafter as input B. As previously indicated, the two balls 16, 18 slide in concentric holes with very little clearance or leakage. With the two balls in the position shown in FIGURE 2, air, which is applied at input A, will flow through the passageway 12 and through the output aperture 22, and then through the output tube 24. The ball 16, prevents any air from moving into the passageway 14. Upon the application of air under pressure to input B the ball 18 slides to the left moving the ball 16 therewith, whereupon opening 22 is blocked. The exhaust aperture 20 is provided to exhaust any air which may pass by the ball 18 and to exhaust any air that may remain in the output opening when it is connected to the apparatus. Upon removal of the air from input B (or its dropping below a pressure whose value is determined by the pressure applied at A and the relative dimensions of the two balls) the smaller ball 16 will move the larger ball 18 to the right whereupon an output will occur through the tube 24.

The arrangement shown provides gain. That is, the results of the same input pressure to B as to A will always result in the balls moving to the position with opening 22 being blocked. The amount of this gain is largely determined by the ratio of the ball diameters.

Figure 3:
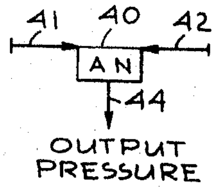
FIGURE 3 shows how the logical structure shown in FIGURES 1 and 2 may be represented schematically.

Referring to FIGURE 3, the symbology to be employed is represented therein. A rectangle 40 represents the logical element and an A input is applied at the "And" side which is the smaller ball side and a B input is applied to the "Not" side which is the larger ball side.

The directions indicated by the arrows respectively 41, 42, and 44, respectively indicate the two inputs and the output pressure. It will be noted that the output 44 is represented as being taken from the middle of the bottom side of the rectangle and the respective A and B inputs respectively 41, 42, are applied to the top side of the rectangle. The single element shown in FIGURE 3 may be considered as a logical inhibitor since an input to B inhibits any output due to an input from A.

Figure 4:
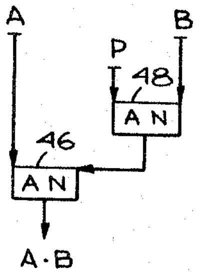
FIGURE 4 shows how the basic logical element may be combined into an And gate.

FIGURE 4 represents local And structure employing the embodiment of this invention. Two logical elements respectively 46, 48 are employed. A steady supply pressure represented by the letter P is applied to the And side of element 48. The output of element 48 designated as $\overline{B}$ is applied to the Not side of element 46. The input to element 46 designated by the capitol letter A is applied to its And side. The input to the element 48 designated by the capital letter B is applied to its Not side. Any output from the element 46 may be represented in Boolean nomenclature as $A \cdot B$.

The elements are coupled into logic performing structure in the manner described above and subsequently below by the simple expedient of connecting the input and output extending tubes with plastic tubing.

When there is no input to either A or B then the pressure P causes an output $\overline{B}$ from element 48 whereby in element 46 the large ball can move the smaller ball to close off the output from this element. In the presence of an input A, unless this input exceeds the input $\overline{B}$, there is still no output from element 46. The input A, is made less than that required to move the large ball against the input $\overline{B}$.

In the presence of an input B and no input A, then even though the input B terminates the $\overline{B}$ output, since there is no output A, there is no output from element 46.

In the presence of an input A and B, then $\overline{B}$ is cut off. Input A can then move the smaller ball in element 46 until there is an output from element 46 from the A input. This output may be designated as $A \cdot B$. It should be noted that there is no "back pressure" by element 46 on element 48. That is, because of the presence of the exhaust opening 20 in each element, when element 48 has an input B applied thereto, any air in the tube connecting the output of element 48 to the input to element 46, is exhausted through the exhaust opening 20. Thus, the "off" state of each element is an exhaust to atmosphere rather than a trapped air state.

Figure 5:
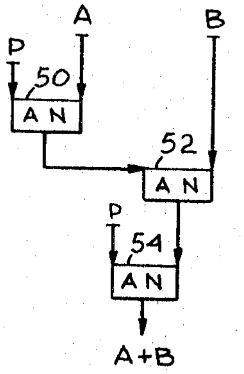
FIGURE 5 shows how the basic logical elements may be combined into an Or gate.

FIGURE 5 shows an arrangement of three elements respectively 50, 52, 54, to provide the function of an "Or" function. This is designated in Boolean symbology as $A+B$. A steady pressure P is applied to the And side of element 50. A steady pressure P is applied to the And side of element 54. Element 50 has the input to the Not side designated as A. The output of element 50 designated as $\overline{A}$ is applied to the And side of element 52. The input to the Not side of element 52 is designated as B. The output of element 52, designated $\overline{A} \cdot \overline{B}$, is applied to the Not side of element 54.

When there is neither an A nor a B input being applied to the structure shown in 55, then the constant pressure applied to element 50 provides an output $\overline{A}$. This in turn can energize the element 52 to provide an output which is designated as $\overline{A} \cdot \overline{B}$. However, no output will be received from element 54 since this output serves to close element 54 against providing any output due to the presence of the constant pressure P at its And input.

In the presence of an input A, the output $\overline{A}$ from element 50 is discontinued. There is no output received from the element 52. The pressure P on the element 54 can thus "open" the element 54 whereby there is an output provided.

In the presence of an input B, and no output A, then the element 52 is "closed" whereby the element 54 can provide an output in view of the application thereto of the pressure P. Thus, the requirement of an output $(A+B)$ in the presence of either an input A or an input B is satisfied. The structure shown in FIGURE 5 thus operates to provide an Or function.

Figure 6:
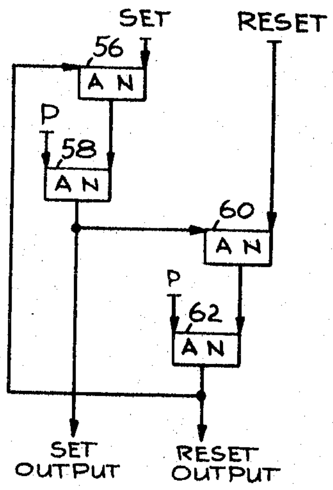
FIGURE 6 shows how the basic logical elements may be combined into a flip-flop arrangement.

FIGURE 6 represents a combination of the basic logical element structures to provide an operation analogous to that of a flip-flop in electrical circuitry. Four elements respectively 56, 58, 60, 62 are employed. Element 56 has an input applied to its Not side, designated as the set input. Its output is connected to the Not side of element 58. The And side of element 58 has the pressure P applied thereto. The output of element 58 is designated as the set output. It is also applied to the And side of the element 60. A reset input is applied to the Not side of the element 60. The output of the element 60 is applied to the Not side of element 62. Also applied to the And side of element 62 is the steady pressure P. The output of element 62 is designated as the reset output and connects back also to the And side of the element 56.

Upon the application of a "set" input to the element 56, this element is closed by virtue of the larger ball therein moving the smaller ball to block the output orifice. Element 58 can then provide an output by virtue of the pressure P being unopposedly applied thereto. This output indicates the set output condition and also is applied through the element 60 to close the element 62 against providing any output due to the input thereof from the pressure source P.

In the presence of a reset input to the element 60, this element is "closed" against transmitting therethrough any output from the element 58. The element 62 can then, under the influence of the pressure P, provide a reset output. The output of the element 62 is then fed back to the element 56. The input to the element 56 is applied as an output to "close" the element 58.

It should be noted that the flip-flop structural arrangement shown in FIGURE 6 has two stable states, respectively designated as the Set and the Reset states. The structure can be triggered from one state to the other by the application of fluid under pressure to the input which corresponds to the state to which it is desired to drive the structure.

Figure 7:
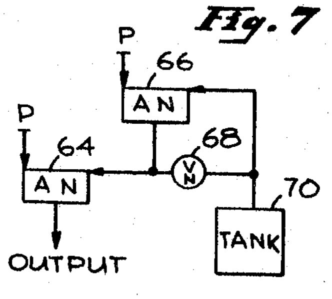
FIGURE 7 shows how the basic logical elements may be combined into an oscillator and buffer circuit.

FIGURE 7 represents a combination of logical elements with additional structure to provide a free-running oscillator with an output buffer. Two elements respectively 64 and 66, are employed. A steady pressure source is applied to the "and" sides of the elements 64 and 66. The output of element 66 is applied to the Not side of element 64 and also through a needle valve 68 back to the Not side of element 66. The feedback path also connects to a closed tank 70. The output for the oscillator is taken from the output of the element 64. Initially, when pressure is first applied to elements 64 and 66, because of the needle valve 68 which acts as a resistance in the feedback path of the element 66, the output of the element 66, because of the gain produced by the large ball of element 64, is sufficient to close the element 64 against any output due to the pressure P applied thereto. However, the tank 70 fills with air coming through the needle valve 68, and continues to build up until it reaches an amplitude sufficient to enable the element 66 to be closed. Thereupon the output from element 66 is cut off whereupon the element 64 can open in response to the pressure applied to its And input. An output will be received from the element 64.

The interval during which output from element 64 occurred is determined by the interval during which element 66 remains closed. This is determined by the time required for the leakage path in element 66 to drain off sufficient air so that the pressure applied to the And side of element 66 can open it again. When this occurs the element 64 is closed for the interval required to enable enough pressure to build up in the feedback path to element 66 to close it again. Thus, the structure shown in FIGURE 7 operates as a free-running oscillator. The element 64 operates as a buffer. The frequency of operation is determined by the resistance provided by the needle valve and the "capacitance" determined by the tank.

Figure 8:
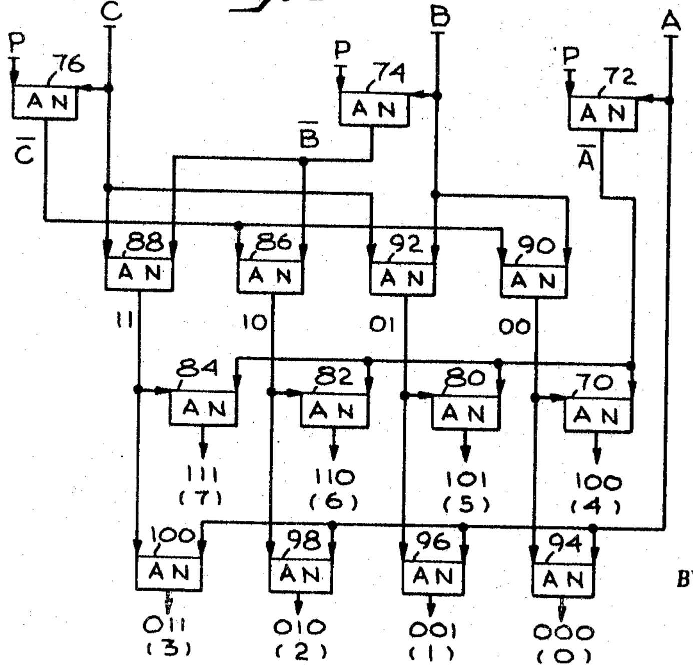
FIGURE 8 shows how the basic logical elements may be combined to perform code conversion.

FIGURE 8 shows an arrangement of fluid operated logical elements in accordance with this invention which are arranged as a parallel binary code converter. Three inputs respectively A, B, and C are provided which occur in varying combinations to represent binary numbers ranging from 000 to 111. Input A is applied to the Not side of element 72, input B is applied to the Not side of element 74, and input C is applied to the Not side of element 76. Air pressure from a constant source P is applied to the And sides of these three elements. The output of element 72 which occurs only in the absence of an input A, is designated as $\overline{A}$, and is applied to the Not sides of elements 70, 80, 82, and 84. The output of element 74, which occurs in the absence of an input B, is designated as $\overline{B}$, and is applied to the Not sides of elements 86 and 88. The output of the element 76, which occurs in the absence of an input C, is designated as $\overline{C}$, and is applied to the And sides of elements 86 and 90. The input C is also applied to the And sides of elements 88 and 92.

The output from element 90 which occurs in the presence of an input $\overline{C}$ is applied to the And sides of element 70 and an element 94. The output of element 92 which occurs in the presence of an input C is applied to the And input of element 80 and the And input of an element 96. The output of element 86 which occurs in the presence of an input $\overline{C}$ is applied to the And sides of element 82 and an element 98. The output of element 88 which occurs in the presence of an input C is applied to the And inputs of element 84 and an element 100.

The outputs from the elements are labeled in the drawing in accordance with their binary representations. A few samples will be given of the operation of the code converter in response to its input, from which its operation in response to any combinations of inputs will be understood.

Assume that an input C and B are apllied and there is no input A. The output of element 72 corresponding to $\overline{A}$ is present and as a result, no outputs occur from elements 70, 80, 82 and 84. Due to the presence of input B, elements 92 and 90 are closed. Due to the presence of input C element 76 is closed but element 88 is open. Since element 84 is held closed due to the input $\overline{A}$, the output of element 88 is applied to element 100 and is sensed at its output. This output corresponds to 011, the binary value of the inputs B and C.

Assume an input A and C and no input B. The input A closes elements 94, 96, 98 and 100. No input B means that there is an output $\overline{B}$ from element 74. This closes elements 86 and 88. The input C closes element 76 and is applied through element 92 to element 80. The output of element 80 which occurs in response to this input represents the binary value 101.

A single pressure source may be employed to furnish all the required pressure for operating any of the devices shown herein. As previously pointed out, there is an inherent low output flow resistance with a high input resistance. This enables excellent "fan out" with a minimum of "matching" problems. Switching threshold is determined by ball-area ratio and requires no other adjustments thereafter.

FIGURES 9 and 10 respectively represent a top view in section along the lines 10—10 of FIGURE 9, of an embodiment of the invention which employs three balls instead of two. The basic element comprises a center portion which may be made of two blocks respectively 102, 104, and two end plates respectively 106, 108. These blocks can be held in assembled form by various means such as bolts respectively 110, 112, which are represented by the dotted lines shown in FIGURE 9.

The structure of the three-ball fluid-logic element is substantially identical with that of the two-ball fluid-logic element except that it provides for another large ball to be employed therewith. Thus, the central block portion will have drilled therethrough a large passage 113, which is concentric with a smaller passage 114. The large passage 113 will permit the insertion therein with just enough clearance to permit two large balls respectively 116, 118 to be slidable. The small passage 114 will permit the insertion therein of the smaller ball 120, with just enough clearance to be slidable therein. An exhaust port 122 is provided for any air that leaks past the larger balls. The exhaust port also serves the same function as was described in connection with the two-ball element, namely to "ground" the output when the balls are in the "closed" position by effectively coupling the output opening through the intervening passageway to the exhaust opening.

A supply pressure port 124 is provided for applying pressure to the supply pressure port. A tube 123 is shown extending into an opening in the side piece 108 from which the passage 124 extends at right angles into the smaller passageway 114. An exhaust port 126 opens through a side of the central section 104 into the smaller passageway. A tube 128 extends into this opening 126. The opening 126 is positioned so that when the ball 120 is moved to its furthest position against the larger ball 118, air which is applied to the tube 123 can exhaust through the opening 126. However, when the ball 120 is moved to its opposite position by the pressure applied to either one of the balls 116, 118, then air which is applied to the tube 122 can be prevented by the ball 120, from passing out of the tube 126.

An opening 130 which may be considered as the first input opening is positioned in the central section 102, so that it is adjacent to the side of the ball 118, when the logic element is in its open position. A tube 132 is inserted into the opening 130. An opening 134 which permits the application of air pressure against the ball 116, is positioned adjacent ball 116 and a tube 136 is inserted therein.

In the presence of no air pressure inputs to either input 1 or input 2 air pressure applied to tube 122 acts on the ball 120 causing it to slide the two large balls back into their passageway whereby air flowing through the opening 124 flows into the small passageway 114 and out through the exhaust opening 126. Upon the application of air to either input 1 or to either input 2 or to both, the large balls 116, 118, move in a direction to push the small ball 120 against the opening 124 thereby preventing any air being applied to the tube 122 from flowing out of the output tube 128. Any air which passes the balls 116, 118, escapes through the exhaust port 122.

FIGURE 11 is a logical representation of the logical structure shown in FIGURE 10. There are two inputs respectively 144, 146, which are shown as arrows applied to the corners of the base of the triangle 140. Either input prevents an output from being obtained from the element which is represented by an arrow 142 extending from the apex of the triangle 140. An input 144 or 146 serves to turn off the output. Each input has a pressure gain and the input impedance is substantially that of a closed chamber.

It will be assumed throughout the discussion herein with the three-ball logical element being represented by the triangle that in every case an additional input is provided, which is not shown, which additional input is a constant supply pressure to the input tube 122 of each of the elements.

The logic effectuated by the system shown in FIGURES 9, 10 and 11 is that of an inverter. That is, an input A results in an output $\overline{A}$.

Referring now to FIGURE 12, there is seen an assembly of logical elements respectively 148, 150, 152, to provide an And function. Only a single input to each one of the elements 148, 150 is employed. The output from each of these elements respectively represented as $\overline{A}$ and $\overline{B}$ is applied to the element 152 as its two inputs. In the presence of an input A, since element 150 is still providing an output $\overline{B}$, element 152 is closed. Similarly, in the presence of an input B, since element A is still providing an output $\overline{A}$ element 152 is closed. In the presence of an input A and B, element 152 remains open and therefore its output may be considered representative of the And function A·B.

In FIGURE 13, there are shown two elements respectively 154, 156, which are employed to provide the Or function. The inputs to element 154 comprise input A and input B. The output of element 154 is applied to only one input of element 156. In the absence of an input A or an input B, there is an output from element 154 and this may be represented as $\overline{A+B}$. The output $\overline{A+B}$ closes element 156 and thus there is no output therefrom. However, should an input A or an input B be applied to element 154, then there is no output therefrom and as a result element 156 does provide an output whereby its output may be represented as $A+B$.

FIGURE 14 shows an arrangement for a flip-flop employing the three-ball elements. This requires two elements respectively 158, 160. One input to element 158 comprises a set input. The output of element 158 is applied as one input to element 160. The other input to element 160 is the reset input. The output of element 160 is fed back as the second input to element 158. The output of element 158 is indicative of the reset state of the flip-flop and the output of element 160 is indicative of the set state of the flip-flop.

An input to the reset side of element 160 closes that element whereby there is no set output. Element 158 however, in view of the constant pressure applied thereto, is open and does continue to provide a reset output. Upon the application of a set input to element 158, element 158 is closed whereupon element 160 can open. The set output of element 160 is fed back to element 158 and insures that it remains closed. The arrangement shown in FIGURE 14 has two stable states and is transferred from one to the other of these two stable states by the respective set, reset inputs.

FIGURE 15 shows an arrangement of elements in accordance with this invention to provide a half-adder structure. Five elements respectively 162, 164, 166, 168, and 170 are employed. The inputs to the half-adder are indicated as input A, which is applied to element 162 and element 164, and input B which is applied to element 166 and element 164. An output is received from element 162, designated as $\overline{A}$, when no input A is applied thereto. An output is received from element 166, designated as $\overline{B}$, when no input B is applied thereto. An output is received from element 164, designated as $\overline{A}+\overline{B}$, in the absence of input A and B. The output $\overline{A}+\overline{B}$ is applied as one input to element 170 and the output of element 168 is applied as a second input to element 170.

In the presence of an input A or B, but not in the presence of both, element 170 will provide an output which may be represented in the Boolean manner as $A\cdot\overline{B}+\overline{A}\cdot B$. In the presence of inputs A and B then element 168 provides an output which serves to block or close element 170. The output from element 168 is representative of the carry being present, which is the case when a binary addition of two "1's" occurs.

From the foregoing illustrations, it will be appreciated that fluid-operated logical elements have been provided whereby for use in performing any logical function basically formed with "nor" logical elements. It will be noted that the input to the large ball is effectively amplified to overcome the input to the small ball. Thus, examples of logic structures provided by combinations of these basic elements which are shown herein, should be considered as exemplary and by no means as exhaustive, since those skilled in the art will have no difficulty in combining these elements to provide other desired functions.

By the simple expedient of placing electrical contacts on either side of a passageway which may be bridged by a ball or not, depending upon the ball position it is possible to obtain an electrical indication of the state of each element or the last element in any logical arrangement which is constructed using the elements described herein. The embodiment of the invention may be constructed to have a plurality of logical elements in a single structure. That is for example, the structure shown in FIGURES 9 and 10 may be enlarged so that a single supply pressure passage 122 feeds a plurality of side-by-side spaced three ball structures of the type shown. Thereby, a plurality of these logical elements in the same structure may be interconnected by tubing to provide a desired logical operation.

There has accordingly been described and shown herein a novel, useful and unique fluid operated logic element structure whereby logical functions may be accomplished reliably and simply.

What is claimed is:

1. A fluid-actuated logic structure comprising a first fluid actuated means, a second fluid actuated means, each having a first and a second fluid pressure input, an output, means responsive to a fluid pressure applied to its first input to provide a fluid pressure output, and means responsive to a fluid pressure applied to its second input to prevent any fluid pressure output, and means coupling said first and second fluid actuated means for providing an output manifestation indicative of the fluid pressure inputs to said first and second fluid actuated means, said means coupling said first fluid actuated means to said second fluid actuated means for providing an output manifestation indicative of the fluid pressure inputs comprises a third and fourth fluid actuated means having structure identical to the structure of said first and second fluid actuated means, means coupling the output of said first fluid actuated means to the second input of said third fluid actuated means, means coupling the output of said third fluid actuated means to the first input of said second fluid actuated means, means coupling the output of said second fluid actuated means to the second input of said fourth fluid actuated means, and means coupling the output of said fourth fluid actuated means to the first input of said first fluid actuated means whereby the outputs of said first and fourth fluid actuated means indicate whether a fluid pressure input was applied to said first or said second fluid actuated means.

2. A fluid actuated logic structure comprising a first fluid actuated means, a second fluid actuated means, each having a first and a second fluid pressure input, an output, means responsive to a fluid pressure applied to its first input to provide a fluid pressure output, and means responsive to a fluid pressure applied to its second input to prevent any fluid pressure output, and said means coupling said first and second fluid actuated means for providing an output manifestation indicative of the fluid pressure inputs to said first and second fluid actuated means including first means coupling the output of said first fluid actuated means to the second input of said second fluid actuated means, and second means coupling the output of said first fluid actuated means to its second input, said second means including valve resistance means and tank capacitance means.

3. A fluid-actuated oscillator comprising a first and a second fluid operated logical element each comprising a fluid actuated logical element comprising a body of material having a first input aperture and an output aperture therein, a first passage therein affording communication between said first input aperture and said output aperture, first ball means in said first passage movable therein between a first position for blocking communication between said first input aperture and said output aperture and a second position wherein said communication is afforded, a second passage in said material concentric with said first passage and in communication therewith, said second passage being larger than said first passage, a second ball means in said second passage movable in said second passage to a first position whereby it moves said first ball means to its first position and to a second position whereby said first ball means may be moved to its second position, a second input aperture in said body of material communicating with said second passage at the side of said second ball means which is furthest away from said first ball means, means for applying fluid under pressure to said first input aperture for moving said first ball means and therewith said second ball means to their respective first positions, whereby an output is obtained from said output aperture, means for applying fluid under pressure to said second input to move said second ball means and therewith said first ball means to their respective first positions whereby no output is obtained from said output aperture, first means coupling the output of said first fluid operated logical element to the second input of said second fluid operated logical element, and second means coupling the output of said first fluid operated logical element to the second input of said first fluid operated logical element, said second means including valve means for determining the resistance of said second means, and tank means for establishing the capacitance of said second means.

4. A fluid-actuated logic structure comprising a first fluid actuated means, a second fluid actuated means, each having a first, second and third fluid pressure input, an output, means responsive to a fluid pressure applied to its first input to provide a fluid pressure output, means responsive to a fluid pressure applied to its second input to prevent any fluid pressure output, and means responsive to a fluid pressure applied to its third input to prevent any fluid pressure output, means coupling the output of said first fluid actuated means to the second input of said second fluid actuated means, and means coupling the output of said second fluid actuated means to the second input of said first fluid actuated means to thereby enable the outputs of said first and second fluid actuated means to indicate an application of a fluid pressure input to the third input of said first fluid actuated means or to the third input of said second fluid actuated means.

5. A fluid pressure half-adder comprising first, second, third, fourth and fifth fluid actuated means each having a first, second and third fluid pressure input, an output, means responsive to a fluid pressure applied to its first input to provide a fluid pressure output, means responsive to a fluid pressure applied to its second input to prevent any fluid pressure output, and means responsive to a fluid pressure applied to its third input to prevent any fluid pressure output, means coupling the first fluid actuated means output to the second input of the second fluid actuated means, means coupling the third fluid actuated means output to the third input of the second fluid actuated means, means coupling the fourth fluid actuated means output to the third input of the fifth fluid actuated means, means coupling the output of the second fluid actuated means to the second input of the fifth fluid actuated means, and means for applying a fluid pressure simultaneously to the second inputs of said first and fourth fluid actuated means and to the third inputs of said third and fourth fluid actuated means whereby the output of said second fluid actuated means represents a carry digit and the output of said fifth fluid actuated means represents a sum digit.

References Cited by the Examiner

UNITED STATES PATENTS 3,242,946 3/1966 Chabrier et al. ---- 137—625.65

FOREIGN PATENTS 1,329,720 5/1962 France.

RICHARD B. WILKINSON, *Primary Examiner.*

L. R. FRANKLIN, *Assistant Examiner.*